Oct. 3, 1950 — A. W. WEIR — 2,524,499
FOLDING HAMMOCK SUPPORT
Filed April 13, 1949 — 2 Sheets-Sheet 1
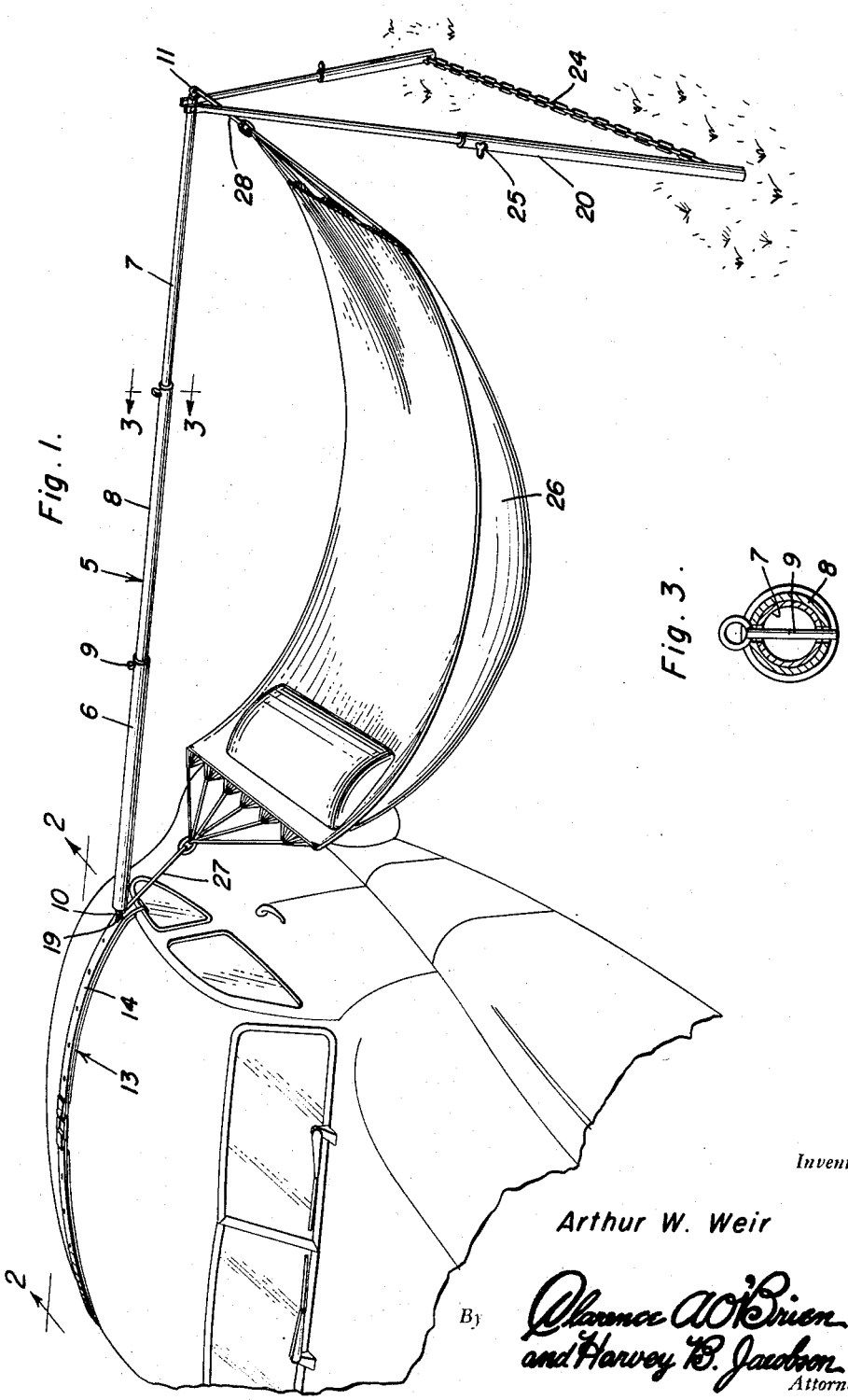
Inventor
Arthur W. Weir

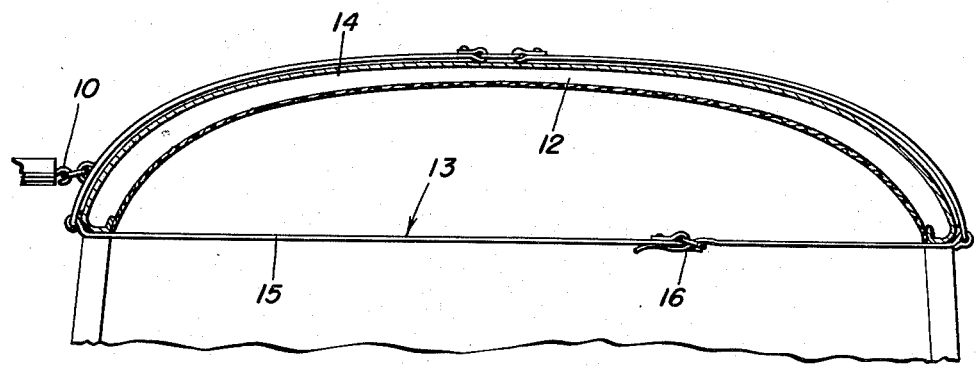
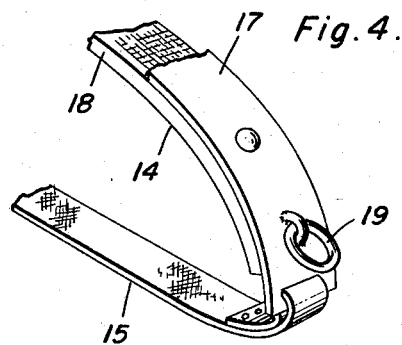
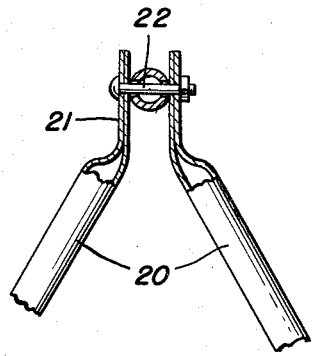
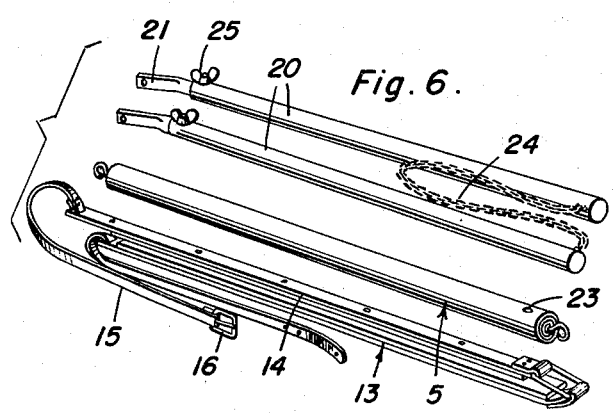

Patented Oct. 3, 1950

2,524,499

UNITED STATES PATENT OFFICE 2,524,499

FOLDING HAMMOCK SUPPORT

Arthur W. Weir, Wilmington, Calif.

Application April 13, 1949, Serial No. 87,331

3 Claims. (Cl. 5—127)

The present invention relates to new and useful improvements in hammock supports and more particularly to a folding hammock support embodying means for attaching one end of the support to an automobile whereby a hammock may be supported at one side of the automobile.

An important object of the invention is to provide attaching means on one end of the hammock support engaging the top of an automobile without requiring the use of permanent fasteners or other elements which might mar the finish or appearance of the automobile.

A still further object is to provide a hammock support including a strap attached to the top of an automobile and to which one end of an overhead bar of the hammock support may be detachably connected.

A further object is to provide a device of this character of simple and practical construction, which is strong and durable, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view showing the hammock support attached to an automobile;

Figure 2 is a transverse sectional view of the top of the automobile showing the attaching strap for the hammock support in its attached position;

Figure 3 is a transverse sectional view of the overhead bar of the hammock support taken on a line 3—3 of Figure 1;

Figure 4 is an enlarged perspective view of a portion of the attaching strap showing the eye carried thereby for attaching the overhead hammock supporting bar thereto;

Figure 5 is an enlarged vertical sectional view of the upper ends of the legs forming part of the hammock support; and Figure 6 is a group perspective view of the hammock support and strap in folded position.

Referring now to the drawings in detail, wherein for the purpose of illustration I have disclosed a preferred embodiment of the invention, the numeral 5 designates a sectional telescoping overhead hammock supporting bar including inner and outer sections 6 and 7 and an intermediate section 8 telescoping one within the other and secured in their open or extended position by locking pins or the like 9. A hook 10 is suitably secured to the inner end of inner section 6 and a hook 11 is suitably secured to the outer end of outer section 7.

The inner end of bar 5 is supported by the top 12 of an automobile by means of a strap 13 composed of a pair of top sections 14 positioned transversely of the top 12 of the autmobile and a bottom section 15 provided with a buckle 16 and attached to the ends of the top section 14 and extending through the door or window openings in the automobile to the underside of top 12 to thus secure the strap in position on the top.

The pair of top sections 14 of the strap are constructed of an outer layer 17 of leather or other suitable strong material to the underside of which a strip of padding material 18 is suitably secured to rest on the outer surface of the top 12 of the automobile to prevent marring the finish thereof.

A ring 19 is suitably secured to the leather outer layer 17 of the strap adjacent the outer end of one of the upper strap sections 14 to which the hook 10 at the inner end of the bar 5 is engaged to support the inner end of the bar in a raised outwardly extending position with respect to the automobile.

The outer end of bar 5 is supported in a raised position by a pair of legs 20 preferably of tubular sectional contruction for telescoping in a folded position, the upper ends of the legs being formed with flattened tongues 21 through which a pin 22 extends and which passes transversely through the outer end of the outer section 7 of the bar 5 by means of openings 23 formed in the bar.

The lower ends of legs 20 diverge in a spread-apart position and are connected to each other by a chain 24. The legs are secured in an extended or raised position by pins 25.

A hammock 26 is supported at the ends of bar 5 by attaching the head of the hammock to the hook 10 by means of a rope 27 and attaching the foot of the hammock to hook 11 by means of a rope 28.

The several parts of the device may be detached and collapsed or folded into a compact form, as shown in Figure 6 of the drawings, for conveniently carrying or storing the same.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A hammock support comprising an overhead bar, and means supporting each end of the bar in a raised position, said means comprising an attaching strap at least at one end of the bar circumposing the top of a vehicle crosswise of said top.

2. A hammock support comprising an overhead bar, and means supporting each end of the bar in a raised position, said means comprising an attaching strap at least at one end of the bar embracing the top of a vehicle, said strap including a top section resting on top of the vehicle and composed of an outer layer of inelastic material and a bottom layer of padding material.

3. A hammock support comprising an overhead bar, and means supporting each end of the bar in a raised position, said means comprising an attaching strap at least at one end of the bar circumposing the top of a vehicle crosswise of said top, said strap being provided with a ring at one side of said top and said bar having at said end a hook engaging said ring.

ARTHUR W. WEIR.

REFERENCES CITED

The following references are of record in the file of this patent:

UNITED STATES PATENTS

| Number | Name | Date |
| --- | --- | --- |
| 664,672 | Palmer | Dec. 25, 1900 |
| 755,039 | Patten | Mar. 22, 1904 |
| 1,349,268 | Cummings | Aug. 10, 1920 |
| 1,363,437 | Robertson | Dec. 28, 1920 |